United States Patent [19]

Suzuki et al.

[11] 4,432,621

[45] Feb. 21, 1984

[54] AUTO-FOCUS BUILT-IN CAMERA

[75] Inventors: Toyotosi Suzuki; Hideo Tamamura, both of Tokyo; Mutsuhide Matsuda, Kanagawa, all of Japan

[73] Assignee: Canon Kabushiki Kaisha, Tokyo, Japan

[21] Appl. No.: 338,100

[22] Filed: Jan. 8, 1982

[30] Foreign Application Priority Data

Jan. 16, 1981 [JP] Japan ................................. 56-5639

[51] Int. Cl.³ ................................................ G03B 3/00
[52] U.S. Cl. .................................... 354/403; 354/288
[58] Field of Search .......................... 354/25, 195, 288

[56] References Cited

U.S. PATENT DOCUMENTS

| 3,653,762 | 4/1972 | Harvey | 354/25 X |
| 4,257,705 | 3/1981 | Hosoe et al. | 354/25 X |
| 4,313,655 | 2/1983 | Hell et al. | 354/25 |

FOREIGN PATENT DOCUMENTS 256610  8/1967  Austria ................................. 354/25

*Primary Examiner*—Michael L. Gellner
*Attorney, Agent, or Firm*—Toren, McGeady and Stanger

[57] ABSTRACT

An auto-focus built-in camera characterized by the arrangement of a range finding system for auto-focus utilizing the space between the film supply chamber and the film takeup chamber.

8 Claims, 5 Drawing Figures

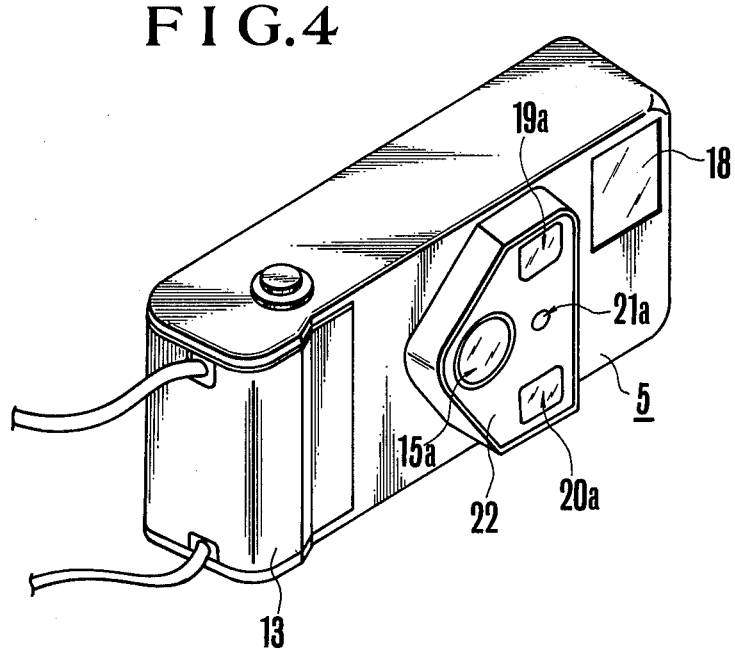
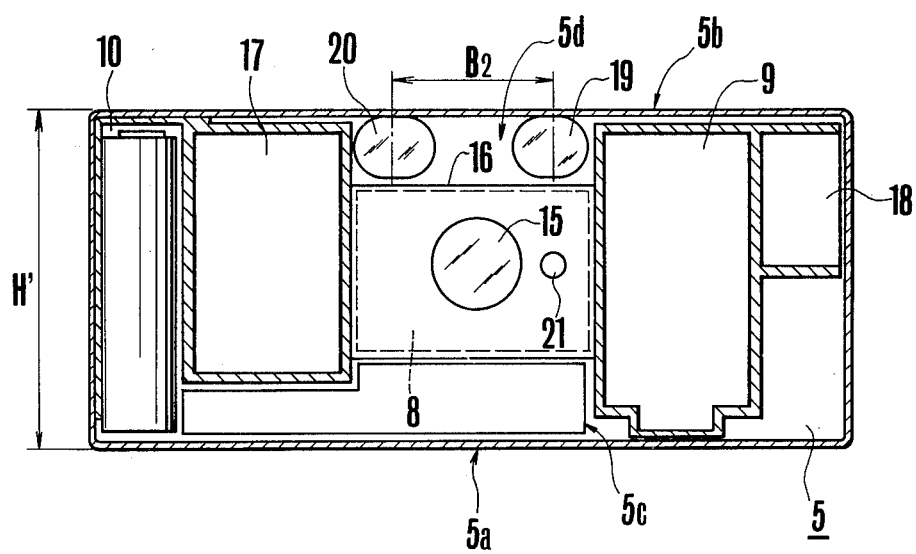

AUTO-FOCUS BUILT-IN CAMERA

BACKGROUND OF THE INVENTION

1. Field of the Invention

This invention relates to cameras, and more particularly to auto-focus cameras.

2. Description of the Prior Art

Recently, various forms of auto-focus cameras have been proposed and have found practical use.

Most auto-focus cameras are made with the range finding system for auto-focus arranged in the upper part of the camera, that is, in the neighbourhood of the viewfinder.

Therefore, the total height of such a camera amounts to the length of the film supply chamber plus that of the range finding system, and thereby much higher, thus contributing to the drawback of incompatibility with an advance in the compactness of the system.

SUMMARY OF THE INVENTION

With the foregoing in mind, the present invention has for its principal object to provide a more advantageous form of auto-focus camera which can obvaite the above-described drawback in the prior art.

That is, it is an object of the present invention to provide a novel advantageous form of auto-focus camera which, regardless of the fact that the auto-focus mechanism is built into the camera nevertheless, allows its total height to be reduced without causing any increase in the lateral dimension, thereby contributing to a minimization of the bulk and size of the camera.

In accordance with the present invention, an advantageous form of auto-focus built-in camera is provided wherein the range finding system for auto-focus is arranged utilizing the space between the film supply chamber and the film takeup chamber.

It is noted that according to preferred embodiments of the present invention to be more fully described later, the aforesaid range finding system includes a pair of range finder windows separated from each other by a predetermined base line length, the arrangement being such that these windows lie between the film supply and takeup chambers either along a direction in which the film advances, or a direction almost perpendicular to the advancing direction (that is, almost perpendicular to the bottom of the camera housing).

These and other objects and features of the present invention will become apparent from the following description of embodiments thereof by reference to the accompanying drawings.

BRIEF DESCRIPTION OF THE DRAWINGS

The present invention will next be described in connection with embodiments thereof by reference to the drawings.

FIG. 4 shows a perspective view of the outer appearance of the camera of FIG. 2.

FIG. 5 shows a schematic view illustrating the outline of the internal structure of another embodiment of the present invention.

DETAILED DESCRIPTION OF THE PREFERRED EMBODIMENTS

Although the following discussion will be directed to an example of application of the invention to cameras employing the active type base line range finder system with the inclusion of a light projecting means for projecting light to an object to be photographed and a light receiving means for receiving the reflected light from the object, it should be understood that the present invention is of course not confined only to the example of such range finding system.

Figure 1:
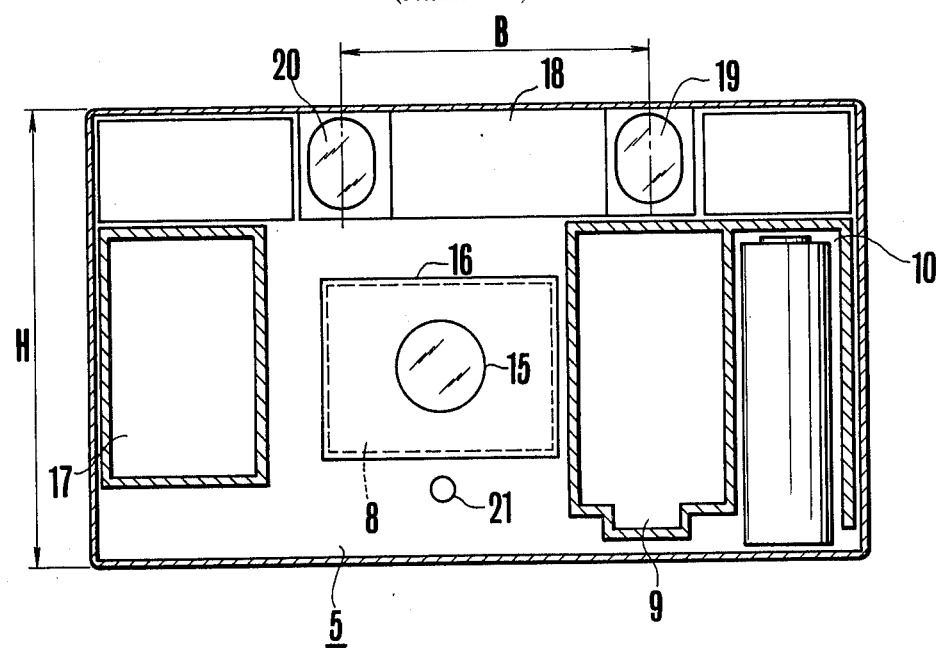
FIG. 1 shows a schematic elevational view illustrating the outline of the internal structure of the conventional auto-focus built-in camera.

Now, conventional auto-focus built-in cameras of this type have been designed to that the range finder system for auto-focus including a projection lens 20 and a collection lens 19 is arranged in a position above the camera near the viewfinder as illustrated in FIG. 1.

Therefore, such camera has a height H (see FIG. 1) which overruns the height of the film supply chamber 9 by further addition of the height of the range finder system for auto-focus, thus disadvantageously amounting to a considerably large bulk and size.

The camera of the invention can eliminate such a drawback as will be seen below. In FIGS. 2 to 4, 5 is a camera housing; 15 is an objective lens; 9 is a film supply chamber; 17 is a film takeup chamber. As illustrated in FIG. 3, in the chamber 17 there is arranged a film takeup spool including an inner sleeve 1 and an outer sleeve 2. It is noted that film engaging pawls 2a are formed in the outer sleeve 2 of the spool which engage a film 3. 10 is a battery chamber; 13 (FIGS. 3 and 4) is a cover of the battery chamber of which the outer shape serves as a holding grip. 18 is a viewfinder; 16 is a light shielding frame provided between the objective lens 15 and an exposure aperture plate 8 (FIG. 3); 6 (FIG. 3) is a film pressing plate.

Now it should be pointed out in connection with such construction of the camera that the projection and collection lenses 20 and 19 in the aforesaid active type base line range finding system are arranged in separation from each other by a predetermined base length B1 along a direction almost perpendicular to the direction in which the film 3 advances, that is between the bottom panel 5a and upper panel 5b of the camera housing, thereby utilizing the space between the film supply chamber 9 and the film takeup chamber 17 as illustrated in the drawings. Here, those portions of the space which the projection and collection lenses 20 and 19 occupy are dead ones 5c and 5d which have so far been produced above and beneath the light shielding frame 16 and between the film supply chamber 9 and the film takeup chamber 17, because the full height of the apertured plate 8 is shorter than the full height of the film supply chamber 9. In this embodiment, therefore, these spare spaces 5c and 5d are intended to be utilized for accommodation of the light projecting portion and the light receiving portion of the range finding system respectively. It is noted that as is evident from the comparison of FIGS. 1 and 2, a large reduction of the total height of the camera from the conventional height H to the height H' can be achieved. Incidentally, in this case, the projection and collection lenses 20 and 19 are necessarily accociated with a light emitting element 24 and a light sensitive element 23 in the rear thereof respectively. So, it is possible to ensure a sufficient axial separation A in each pair of lens and element.

Figure 2:
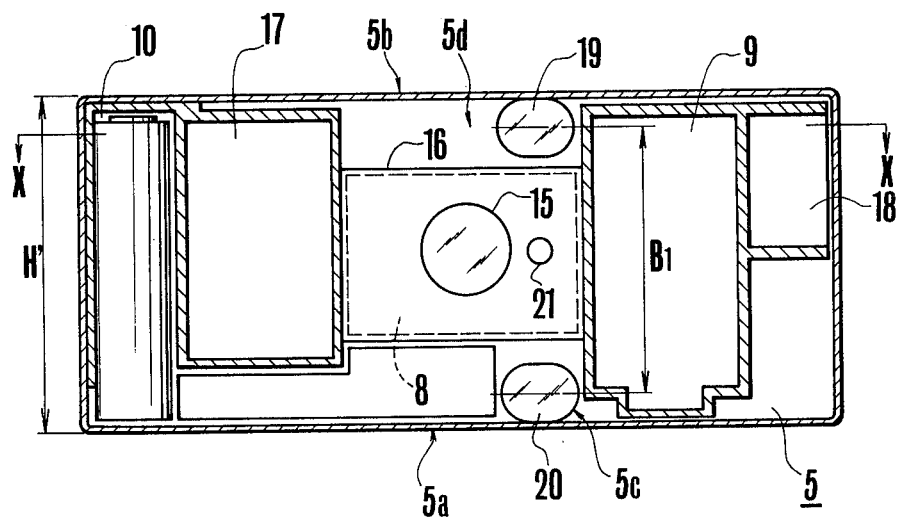
FIG. 2 shows a schematic elevational view illustrating the outline of the internal structure of one embodiment of an auto-focus built-in camera according to the present invention.
Figure 3:
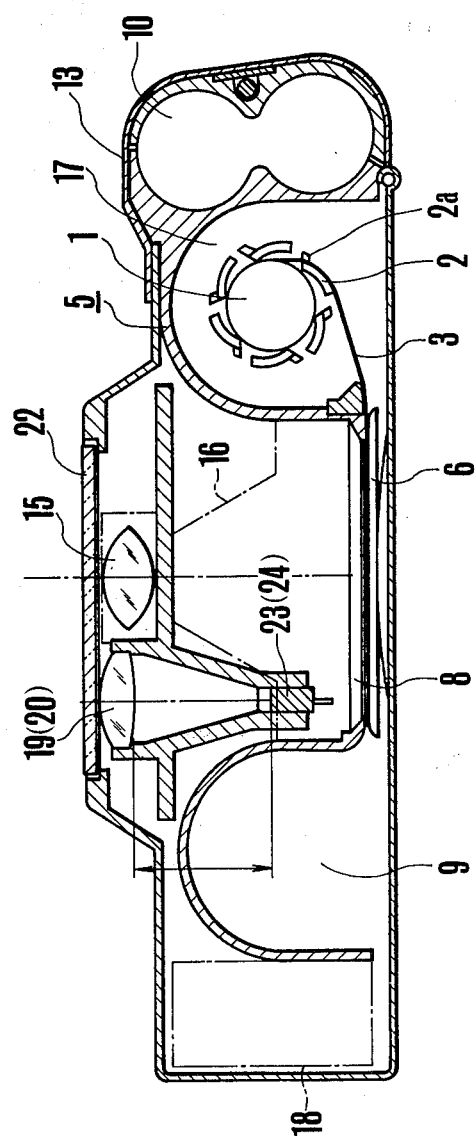
FIG. 3 shows a sectional view taken along X—X line of FIG. 2.

Turning to FIG. 2, 21 is a collection lens for the exposure measurement, and also to FIG. 4, 15a is a window for photo-taking; 20a is a light projection window for range finding; 19a is a light receiving window for range finding; 21a is a light receiving window for the exposure measurement. Arranged behind these windows 15a, 20a, 19a and 21a are the aforesaid lenses 15, 20, 19 and 21 respectively. 22 is a protection glass provided in common to all the windows 15a, 20a, 19a and 21a.

Next, another embodiment illustrated in FIG. 5 utilizes that part of the space between the film supply chamber 9 and the film takeup chamber 17 which lies above the light shielding frame 16 as indicated at 5d, and it is here that the light projection and collection lenses 20 and 19 are arranged separated from each other by a base line distance B2, in this instance, along the direction in which the film 3 advances, or along the upper panel 5b of the camera. The use of such arrangement will shorten the distance between the collection lens 19 and projection lens 20, or the base length. But the height of the camera can be retained low likewise as in the first embodiment.

It is noted that in the second embodiment, mechanical elements the same as those of the first embodiment are denoted by the same reference characters, and therefore, an explanation thereof is omitted.

Though the above-described embodiments have been described in connection with examples of a camera having a built-in active type base line range finding system as the range finding system for auto-focus, it is a matter of course that even when using a passive type range finding system, the possibility of minimizing the bulk and size of the camera can also be achieved by the arrangement of the range finding system according to the above-described embodiments of FIGS. 2 to 5.

As in the above, according to the present invention, not only the possibility of compressing the height of the camera can be achieved, but also various advantages are produced.

(1) The space between the objective lens and the film supply chamber is relatively freed from invasion of foreign mechanisms as compared with remaining parts of the interior of the camera, and because a sufficient space can be taken in the depth direction, it is made possible to build the auto-focus mechanism into the camera without involving an increase of the thickness thereof.

(2) Since the range finder windows for auto-focus are located at the center of the length of the camera housing, it seldom happens that the windows are covered by the photographer's finder when holding the camera.

(3) Since the auto-focus range finding system is positioned nearer to the objective lens, the range finding error due to the parallax is diminished, thus permitting a more accurate auto-focusing to be performed.

While specific embodiments of the invention have been shown and described in detail to illustrate the application of the inventive principles, it will be understood that the invention may be embodied otherwise without departing from such principles.

What is claimed is:

1. A camera having a built-in auto-focus mechanism, comprising:
    (A) a film supply chamber;
    (B) a film takeup chamber provided at an interval spaced from said film supply chamber;
    (C) a photographic aperture plate arranged in the space between said film supply chamber and said film takeup chamber and having a total height less that that of said film supply chamber; and
    (D) a range finder optical system for said auto-focus mechanism arranged between said film supply chamber and said film takeup chamber at a stepped portion formed by the difference between the total height of said aperture plate and that of said film supply chamber.

2. A camera according to claim 1, wherein said range finder system includes a pair of a light projection optical system and a light collection optical system arranged spaced apart with a predetermined base length along a direction almost perpendicular to the advancing direction of a film supplied from said film supply chamber to said film takeup chamber.

3. A camera according to claim 1, wherein said range finder optical system includes a pair of a light projection optical system and a light collection optical system arranged spaced apart with a predetermined base length along a direction almost parallel to the advancing direction of film supplied from said film supply chamber to said film takeup chamber.

4. A camera according to claim 2 or 3, further comprising:
    a window for photo-taking, said photo-taking window being spatially positioned between said film supply chamber and said film takeup chamber;
    said range finding optical systems being arranged in the neighbourhood of said photo-taking window.

5. A camera according to claim 4, further comprising:
    a protection member common to said photo-taking window and said range finder optical system 6. A camera according to claim 4, further comprising:
    a light receiving window for light measuring arranged in the neighbourhood of said photo-taking window.

7. A camera according to claim 6, further comprising:
    a protection member common to said photo-taking window, said range finder optical system and said light measuring window.

8. A camera according to claim 2 or 3, wherein said range finder system is of an active type which includes means for projecting radiation toward an object and means for receiving radiation coming from the object, said radiation projecting means and said radiation receiving means being arranged in alignment to the respective individual light emitting optical element and light sensitive optical element.

* * * * *